US 6,597,775 B2

(12) United States Patent
Lawyer et al.

(10) Patent No.: US 6,597,775 B2
(45) Date of Patent: Jul. 22, 2003

(54) SELF-LEARNING REAL-TIME PRIORITIZATION OF TELECOMMUNICATION FRAUD CONTROL ACTIONS

(75) Inventors: Justin Lawyer, San Diego, CA (US); Alex Barclay, San Diego, CA (US); Dirk Englund, San Diego, CA (US); Robert Holmes, San Diego, CA (US); Dimpy Pathria, Burr Ridge, IL (US); Tim Roach, San Diego, CA (US); Scott Zoldi, San Diego, CA (US)

(73) Assignee: Fair Isaac Corporation, San Diego, CA (US)

( * ) Notice: Subject to any disclaimer, the term of this patent is extended or adjusted under 35 U.S.C. 154(b) by 0 days.

(21) Appl. No.: 09/963,358

(22) Filed: Sep. 25, 2001

(65) Prior Publication Data
US 2002/0114435 A1 Aug. 22, 2002

Related U.S. Application Data
(60) Provisional application No. 60/236,859, filed on Sep. 29, 2000.

(51) Int. Cl.⁷ .......................... H04M 15/00; H04M 3/00
(52) U.S. Cl. .............................. 379/114.14; 379/112.01; 379/114.01; 379/114.14; 379/127.02; 379/133; 379/188; 379/189; 455/410
(58) Field of Search ................................ 379/1.01, 9.03, 379/114.01, 114.14, 32.01, 33, 112.01, 127.02, 188, 189, 196, 197, 115.01, 129, 133, 134, 137, 139; 455/410

(56) References Cited

U.S. PATENT DOCUMENTS

| | | | | |
|---|---|---|---|---|
| 5,438,570 A | | 8/1995 | Karras et al. ............... 370/94.2 |
| 5,566,234 A | | 10/1996 | Reed et al. .................. 379/188 |
| 5,627,886 A | | 5/1997 | Bowman ..................... 379/111 |
| 5,666,481 A | | 9/1997 | Lewis ..................... 395/182.02 |
| 5,706,338 A | | 1/1998 | Relyea et al. ............... 379/189 |
| 5,768,354 A | * | 6/1998 | Lange et al. ................. 379/189 |
| 5,802,145 A | | 9/1998 | Farris et al. ................... 379/34 |
| 5,875,236 A | * | 2/1999 | Jankowitz et al. ...... 379/114.24 |
| 5,963,625 A | * | 10/1999 | Kawecki et al. ........ 379/127.01 |
| 6,163,604 A | * | 12/2000 | Baulier et al. ............... 379/189 |
| 6,535,728 B1 | * | 3/2003 | Perfit et al. .................. 455/410 |

* cited by examiner

Primary Examiner—Curtis Kuntz
Assistant Examiner—Quoc Duc Tran
(74) Attorney, Agent, or Firm—Robert Sachs; Michael A. Glenn; Glenn Patent Group

(57) ABSTRACT

A predictive model system is used to detect telecommunications fraud. Call records (CDRs) provided by telephone companies are evaluated against specified rules. If one or more rules are matched, the system generates an alert. Pending alerts for a customer form a case, describing the caller's calling patterns. A predictive model determines a score that is predictive of the likelihood that the call involved fraud. Cases are queued for examination by analysts.

3 Claims, 5 Drawing Sheets

SELF-LEARNING REAL-TIME PRIORITIZATION OF TELECOMMUNICATION FRAUD CONTROL ACTIONS

CROSS-REFERENCES TO RELATED APPLICATIONS

This application claims priority under 35 USC §119(e) from U.S. Provisional Application No. 60/236,859, filed Sep. 29, 2000, and titled "Self-Learning Real-Time Prioritization of Telecommunication Fraud Control Actions."

BACKGROUND OF THE INVENTION

1. Field of the Invention

The present invention relates generally to detecting telecommunications fraud using intelligent predictive modeling systems.

2. Description of the Related Art

The rapid growth of the telecommunications industry has been accompanied by a correlative increase in telecommunications fraud. In some situations, however, a telecommunications service may be accessed or obtained in an undesirable fashion, e.g., by fraud, theft, or other nefarious activity, and unauthorized use may ensue. Providers take control actions to stop the provision of service when it is used in an undesirable fashion, e.g., by blocking compromised calling card numbers before service is fraudulently obtained. Unfortunately, by the time fraudulent use is detected and control actions can be taken, there has often already been a significant unauthorized use of the co-opted service, resulting in expense to the service provider. Accordingly, there is a need for a way to identify undesirable and unauthorized use of a service at an early juncture, in order to minimize the amount of loss resulting from that use.

Additionally, long distance carriers regularly lease bandwidth from other carriers. On such occasions, the call data record (CDR) for the call is often stripped of identifying information such as the number from where the call was made ("originating number"). This is done so that the long distance company leasing the bandwidth (the lessor) and completing the call on behalf of another carrier will not attempt to solicit business from the caller at the originating number, who is presumably not one of the lessor's subscribers, but the lessee's subscriber. Unfortunately, this frustrates fraud control efforts, since the information that has been stripped from the CDR would normally be used subsequently to detect fraud. As a result, there is substantial opportunity for fraud in these types of bandwidth exchanges. What is needed is a way to use the information stripped from the CDR to predict fraud, without divulging the stripped information to the provider providing the bandwidth.

BRIEF SUMMARY OF THE INVENTION

The present invention provides a system that includes a predictive model for detecting fraud in Call Data Records (CDRs). Telephone companies (Telcos) provide CDRs to the system, and the CDRs are then evaluated against Telco-specified rules; each participating Telco may define it own set of rules for evaluating calls made through that Telco. If one or more of a Telco's rules are matched, then the system generates an alert. All pending alerts for a caller (individual or company or portion thereof) form a case. The case also contains details—such as a statistical summary of alert-generating calls—about the caller's calling history. The case, current alert information, and a variety of risk factors serve as inputs to the predictive model. The predictive model outputs a score that is predictive of the likelihood that the call being made is fraudulent. This information is then queued for examination by analysts. The queue is designed so that calls that are more likely to involve fraud are examined earlier. After an analyst has made a determination about whether the call involved fraud, or alternatively, if no decision is made on the case within a pre-specified time, the case is saved in a case database. The fraud/no-fraud decision is used to update the risk factors and the predictive model to improve predictions about future alerts.

The features and advantages described in this summary and the following detailed description are not all-inclusive, and particularly, many additional features and advantages will be apparent to one of ordinary skill in the art. Moreover, it should be noted that the language used in this disclosure has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Overall Architecture

Figure 1:
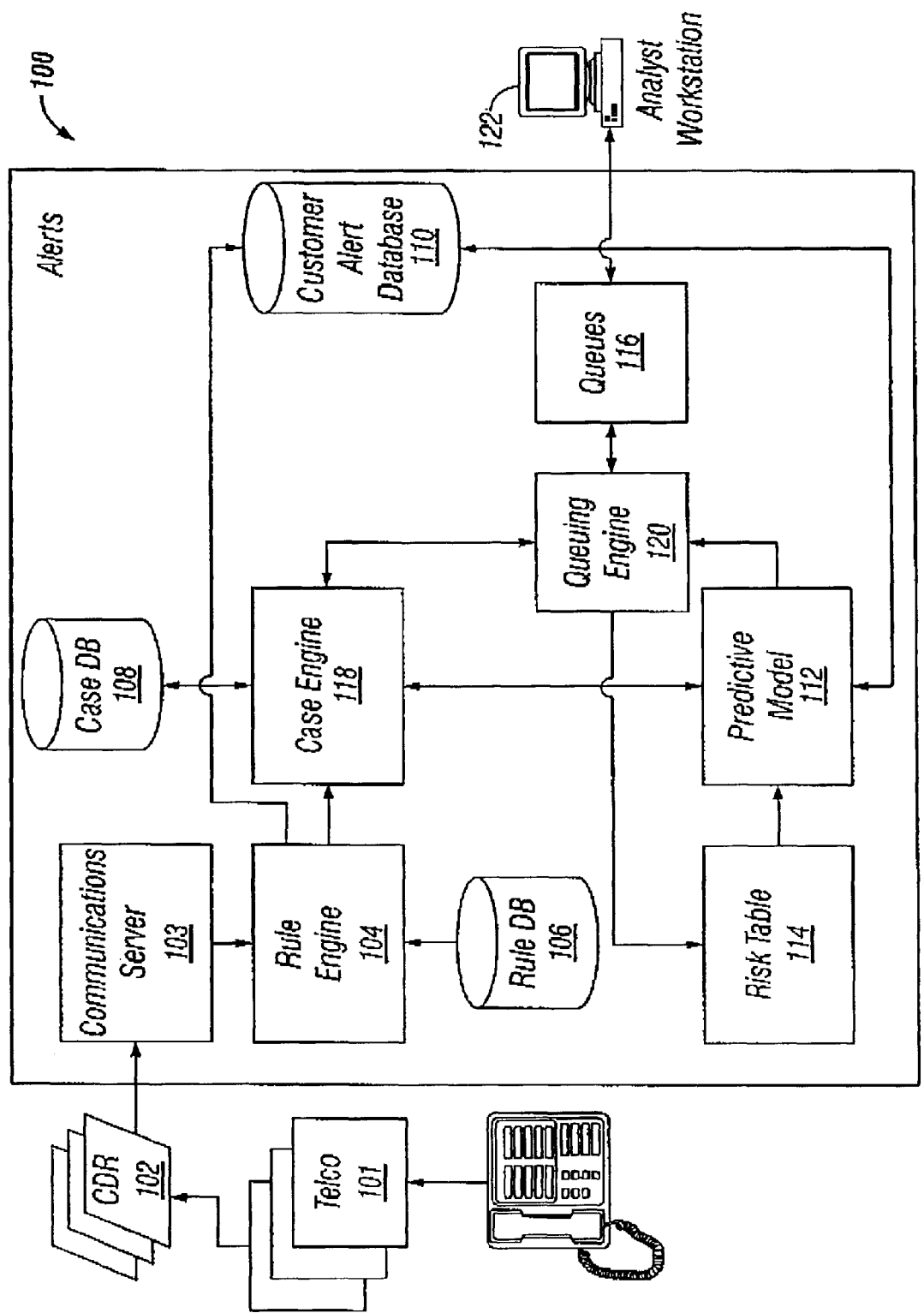
FIG. 1 is a block diagram of an overall embodiment of the present invention.
Figure 2:
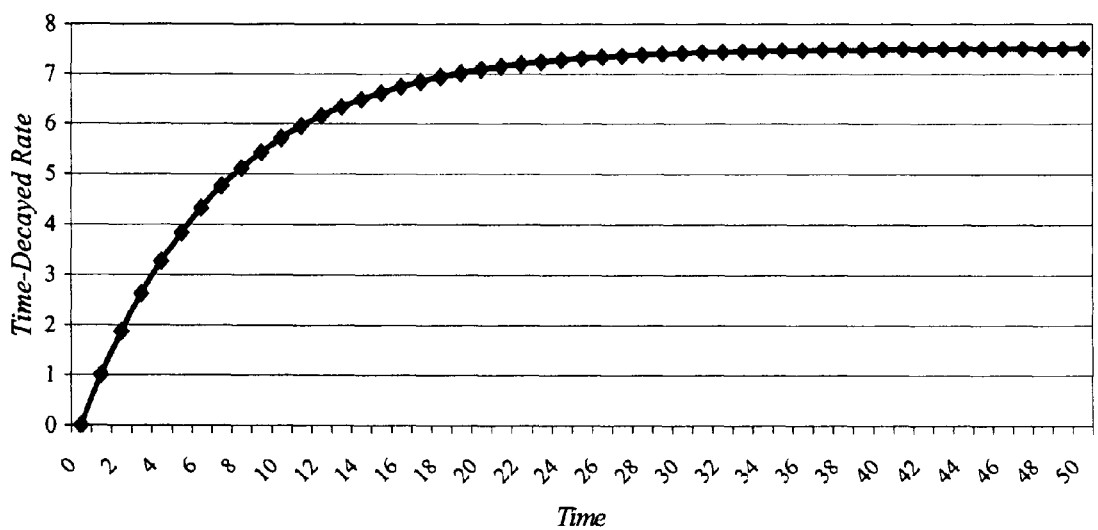
FIG. 2 is a graph illustrating how a time-decayed rate changes over time.

The present invention provides a threshold-based fraud prevention product aimed at detecting fraudulent calls using predictive modeling. Referring now to FIG. 1 there is shown an illustration of one embodiment of a system 100 in accordance with the present invention. The system 100 comprises a communications server 103, rule engine 104, a rule database 106, a case database 108, a case engine 118, a customer alert profile database 110, a predictive model 112, risk tables 114, a queuing engine 120, and various queues 116. Also shown in FIG. 1 are a call data record (CDR) 102 and an analyst workstation 122.

A Call Data Record (CDR) 102, as is known in the art, is a record of a telephone call, and typically contains identification information for the originating telephone number, the terminating telephone number, the billing telephone number (which in some cases may be neither the originating nor terminating number) or credit card number, the time of the call, and the length of the call. The CDR may contain additional data such as information specific to the telephone company billing the call, routing information, etc. More generally, a CDR is an instance of a transaction summary. In other embodiments, a transaction summary will have corresponding content (e.g., details of a credit card transaction).

The communications server 103 receives CDRs from the telephone companies (Telcos) 101, and passes them to the rule engine 104. The CDRs are consolidated from all switches, mediation devices and SS7 surveillance platforms. As is known by those skilled in the art, mediation devices and SS7 surveillance platforms are designed to detect abnormal system behavior. It should be noted here that one of the advantages of the present invention is that it operates with any number of Telcos and can provide fraud detection for either a single Telco, or a large number of Telcos.

The rule engine 104 determines whether an incoming CDR 102 should be further examined for evidence of fraud. This decision is made on the basis of rules stored in the rule database 106. The rule database 106 contains rule sets specified by various telephone companies using system 100. Based on the Telco providing the CDR, the rule engine 104 applies a set of that Telco's specific rules to the CDR. This feature also allows the system to simultaneously evaluate CDRs for different Telcos, thereby providing a fraud detection service to the Telcos.

If the CDR satisfies the corresponding Telco's rules, then rule engine 104 generates an alert, and the alert is sent to the case engine 118. The case engine 118 uses information stored in the case database 108 to update an existing case, or create a new case, as required. The case database 108 contains records of cases examined for fraud, including the dispositions of those cases. Alerts generated by the rule engine 104 are also stored in the customer alert profile database 110.

The predictive model 112 receives cases and scores alerts, and generates a score indicative of the likelihood of fraud (more generally indicative of a level of risk). More specifically, the predictive model 112 receives input from the customer alert profile database 110, the case engine 118, and risk tables 114. The case engine also has access to certain CDR information about the CDRs that generated the alerts.

The predictive model 112 sends cases containing scored alerts back to the case engine 118 along with the score. The case engine 118 then sends the case to the queuing engine 120 for assignment to one of the queues 116 according to a priority. Analysts use analyst workstations 122 to examine cases from the queues 116, preferably in order of highest-to-lowest priorities.

An analyst makes a disposition of a case by deciding whether the case is indeed fraudulent. If fraudulent, then the analyst applies fraud control actions as defined by the provider Telco. Again, this allows each Telco to determine specific control actions to calls that it services. The dispositions (e.g., fraud, no fraud, unconfirmed fraud, unworked) made by analysts are then communicated back to the queuing engine 120, which in turn reports the results to the case engine 118, risk tables 114, and predictive model 112. The risk tables and predictive model are updated in light of the disposition (e.g., recalculating the risk rates in the risk tables, and updating the predictive model parameters). The case engine 118 then closes the case and stores it in the case database 108.

Call Data Records

A telephone company (Telco) using system 100 preferably stores its CDRs in a specified manner for easier processing. At regular intervals, the Telco establishes a connection to the sever 103. This server may be a dedicated system reserved for the Telco's use, or it may be a shared system. The shared system is described in further detail below. In a preferred embodiment, the Telco encrypts a file containing batched CDRs, and sends the batch via FTP to the server 103 of the system 100, where it is decrypted. In other embodiments, other methods may be employed to transmit the CDRs to the system 100 in real time, such as through dial-up connections, wireless connections, etc. Additionally, although the records are encrypted in a preferred embodiment, other embodiments may involve the transmission of unencrypted data.

CDR Evaluation and Alert Generation

Each Telco's CDRs are evaluated according to alert rules defined by that Telco and stored in the rule database 106. When any rule is satisfied, the rule engine 104 generates an alert. Typical rules include call collisions, volume of calls, aggregate duration, geographic velocity, single call duration, hot numbers, and exclusion rules.

For example, call collision detection detects true call overlap. Call overlap occurs when calls charged to the same billing number have start and end time ranges that overlap. When the number of overlapping calls meets a predefined threshold, the call collision function generates an alert.

A call volume rule sets the maximum number of calls that can be made in a fixed time period. Similarly, an aggregate duration rule determines the total amount of billing time that can be spent on the telephone.

Calls can be analyzed to determine distances between call origin points within specific time intervals. The originating number of the last call made is compared to that of the current call charged to the same number. Using vertical and horizontal coordinate data, the system compares the distance and time between calls against Telco-defined thresholds. If the thresholds are exceeded, an alert is tripped.

Miles-per-hour designations determine the impracticality or impossibility of successive calls by the same person. Exceptions are made, for example, for the case when more than one person is granted use of a calling or charge card.

Alerts may also be generated for calls or groups of calls of excessive duration. Telco-defined thresholds are established based on specific billing types, destination and/or origination to generate alerts for lengthy calling activity. Alerts also are generated for hot numbers and excluded numbers, as specified by the Telco.

Additionally, other fields that appear in the CDR may be configured as threshold-sensitive. User-defined fields (qualifiers) can be created to define alert types according to desired parameters. In one embodiment, alerts store only those variables that were tripped, while in other embodiments, all variables are stored in the alert.

In a preferred embodiment, an alert contains information including originating telephone number, terminating telephone number, billing account number, time of call, call type, dial type, and type of alert. Other data may also be present according to the needs of the particular Telco. In a preferred embodiment, a header is prepended to an alert to allow the case engine 118 to identify which case to attach the alert to, as well as the status of that case. (One embodiment has a 26 byte header and a 642 byte payload.)

Case Engine

The case engine 118 attempts to associate the alert with an existing case. A case contains a billing account number or other identification code, an alert table of one or more alerts, a customer profile, and a score field. In one embodiment, each customer has an account code that can be used as the identification code for a case. In other embodiments, the billing number or other identifying data may be used. A case may contain many alerts, and if one or more alerts are already present, the new alert will simply be added to those pending. Each alert in a case is identified in the alert table for the particular case. If an alert is generated and no active cases exist for the identification key, then a new case is created containing the new alert.

The case engine 118 determines to which case each incoming alert belongs based on a key. If a case does not yet exist for that key, a case is created and initialized. As noted, the key will typically be a customer account code or the billing ANI (Automatic Number Identification). In a preferred embodiment, either a billing account number or a billing ANI should always exist. However, as a precaution, alerts with neither a customer account number nor a billing ANI are assigned to an "unknown" case.

In a preferred implementation, the alerts are joined with the case data into a BLOB (binary large object), with new alerts being appended to the end of the BLOB. Each alert is uniquely identified by an alert ID, which is a unique incrementing number that is generated by the rule engine 104. This facilitates retrieval, as only one query is needed into the database to gather all of the case and alert information. The BLOBs are uniquely identified by a key that is associated with the case number.

Customer Alert Profile Database

When an alert is created (tripped), it is stored in the customer alert profile database 110, indexed by billing number or other identification key that corresponds to a billing hierarchy of the provider. Billing hierarchies are discussed in more detail below. A customer alert profile tracks the alert behavior and case outcome of the corresponding subscriber.

The customer alert profile contains historical alert data about the customer. In one embodiment, the profile stores historical data in complete form, including all information associated with the alert. In another embodiment, only statistical summaries of the alert history are maintained in the customer profile. In a preferred embodiment, data that is stored in the customer profile includes alert rates, risk, typical activity and unusual activity. Typical activity, or low-risk activity, is activity which is generally seen on non-fraud alerts. Unusual activity is activity more commonly associated with fraudulent alerts, and is of high risk. The decision as to what types of activity are low and high risk is made in a preferred embodiment by analyzing the activity patterns of dispositioned alerts. This is done automatically in a preferred embodiment, though in alternative embodiments it is done manually. Historical alert data in customer profiles is updated each time an analyst makes a determination about whether a pending alert is fraudulent or not.

The customer alert profile is also an input to the predictive model 112. Customer profiles are collections of variables that capture past and present alert behavior for that customer over time. This profile is updated each time an alert is received, in a preferred embodiment prior to scoring the alert. Variables may also be updated each time an alert is dispositioned. In a preferred embodiment, short-term behavior is captured on a 1½-day time scale while long-term behavior is on a 9-day time scale.

The customer profile variables can be segmented into nine categories, as listed in Table 1 below. A table of customer profile fields is included in Appendix 1.

TABLE 1

| Profile Variable or Category | Description |
|---|---|
| Time of last alert | The timestamp (in seconds) of the last alert that was processed for this subscriber. |
| Time of last alert disposition | The timestamp (in seconds) of the last alert disposition that was processed for this subscriber. |

TABLE 1-continued

| Profile Variable or Category | Description |
|---|---|
| Short term rates of each of the 11 alert types (see Table 2) | Decayed average rates (counts per unit time) for the 11 alert types for this subscriber. The time constant used is the short term constant of 1.5 days. |
| Average short term risk weighted rates of the 11 alert types | Decayed average risk weighted rates (risk multiplied by rate) for the 11 alert fields for this subscriber. The time constant used is the short term constant of 1.5 days. |
| Average long term risks of 11 alert fields | Decayed average risk for the 11 alert fields for this subscriber. The time constant used is the long term constant of 9 days. |
| Ratio of short term to long term average risks of the 11 alert fields | Decayed average value of the ratio of the short term to long term average risks for the 11 alert fields for this subscriber. The short term time constant is 1.5 days, while the long term constant is 9 days. |
| Short term rate of each of the 4 dispositions | Decayed average rates (counts per unit time) for the 4 alert dispositions for this subscriber. The time constant used is the short term constant of 1.5 days. |
| Short term average risk of the customer | Decayed average risk of the subscriber, where the rates of the four dispositions are the short term rates of the four dispositions. The time constant used is the short term time constant of 1.5 days. |
| Combinations of variables above and raw risk variables | See Appendix #1 |

The time stamps refer to the end time of the call generating the last alert and are forward ratcheting only. This means that the most recent time stamp is used when comparing alerts out of order. For instance, suppose an alert with an end time of 10 AM is received and processed, and subsequently an alert with a 9 AM end time is received. The time-of-last-alert variable remains at 10 AM. An 11 AM end time would then cause the time of last alert to ratchet forward to 11 AM. This ratcheting is used to ensure that the profile variables do not grow exponentially if alerts arrive out of order.

When new alerts arrive, the customer profile is updated. The appropriate customer profile variables are updated using the time of the last alert as the incumbent time stamp, and the ENDTIME of the current alert to calculate time differences for all profile variable decays. In one preferred embodiment, the updates are performed in the following order:

Case alert rate

Short term rates of each of the 11 alert types

Long term average case risks of case alert rate and various alert fields

Ratios of short term to long term average case risks of case alert rate and various alert fields Risk weighted rates of case alert rate and various alert fields Time of last alert To perform the decays, the time difference is assumed to be:

$$\Delta t_i = \begin{cases} t_i - t_{i-1}, & \text{if } t_i < t_{i-1} \\ 0, & \text{otherwise.} \end{cases}$$

where $t_i$=ENDTIME of current alert and $t_{i-1}$=ENDTIME of last alert.

In a preferred embodiment, short term decay constants are 1.5 days, while long term decay constants are 9 days. Other decay constants may also be used.

The model then scores the updated profile. It does this by generating an input vector of all profile variables, minus the time stamps. The profile variables and a list of which variables are used as model inputs are included in Appendix 1.

Risk Tables

Risk tables 114 evaluate the relative risk of different alert fields, and adapt over time based on dispositions. For instance, a bill type risk table monitors how the level of risk of each possible bill type value changes over time. The risk tables 114 are dynamic; if there is an entry in an alert that does not have a corresponding value in the risk table, a new entry is added and initialized in the risk table, and updated with the current alert's information. Thus, as new values are added, the risk tables 114 track statistics for those values. For instance, a telephone company might have 50 switches. Each of those switches might have very different risks, depending on the regions and clients served. The risk tables 114 would track the risk of each of those 50 switches, based upon the alerts and dispositions seen. If a new switch were to be installed, it would be added to the tables, which would then track 51 switches.

The risk tables 114 learn by example, so that each time an analyst makes a decision as to whether an alert is fraudulent or not, the risk tables 114 are updated to reflect that decision. This is done for each of the major variables in the alert that is decisioned, including alert rate, properties, alert type, bill type, call type, dial type, originating trunk group, source name, source type name, qualifier, and the velocity screening number type. Thus, the risk tables 114 adapt to changes in the network and fraud traffic by learning from analysts' decisions.

In a preferred embodiment, a profiling technique is used to allow transactions to be summarized effectively. The technique uses profiling filters, which are computed from a set of parameters specific to a customer. These parameters are weighted averages of customer properties. Consider property X, and let T(i) denote the time when the ith alert (with value $v_i$) is processed. The time weighted average for X is then $$x(T_i) = \sum_{j=1}^{i} c_j^i v_j$$

where $$c_j^i = \frac{\int_{\tau_{j-1}}^{\tau_j} e^{-(\tau_i - t)/T} dt}{\int_0^{\tau_i} e^{-(\tau_i - t)/T} dt}$$

$$= \frac{\int_0^1 e^{-t/T} dt}{\int_0^{\tau_i} e^{-t/T} dt} e^{-(\tau_i - \tau_j)/T}$$

$$= \frac{1 - e^{-1/T}}{1 - e^{-\tau_i/T}} e^{-(\tau_i - \tau_j)/T}$$

and $1-e^{-1/T}$ represents the initial weight; $1-e^{-\tau_i/T}$ represents the normalization factor, and $e^{-(\tau_i - \tau_j)/T}$ is the decay factor.

A recursive formula is commonly used. Suppose the profile was last updated at time t=T(i), and a new alert with its disposition is processed at time T(i+1). Then a recursive equation for x(T(i+1)) is:

$$x(\tau_{i+1}) = \frac{1 - e^{1/T}}{1 - e^{-\tau_{i+1}/T}} v_{i+1} + \frac{1 - e^{-\tau_i/T}}{1 - e^{-\tau_{i+1}/T}} e^{-\Delta \tau_i / T} x(\tau_i)$$

where T is a decay constant. A larger T results in slower decay, and hence larger continued influence in older alerts. A faster decay can make the system more sensitive to new fraud schemes.

Risk table variables are decayed in the same manner as profile variables in a preferred embodiment. But whereas the profile variables are specific to a customer, the risk tables are global, and are thus updated at every dispositioned alert.

Risk tables 114 measure the level of risk associated with individual values of various alert fields and quantities. The risk of a certain value is defined as the ratio of the rate of risky alerts to the rate of all worked alerts, where the rates are calculated as per the decayed rate description given above:

$$\text{Risk} = \frac{(\text{fraud rate} + \text{unconfirmed rate})}{(\text{fraud rate} + \text{unconfirmed rate} + \text{nonfraud rate})}$$

The rate of unworked alerts is not included for this calculation, as no information is known as to their true disposition.

In a preferred embodiment, the system 100 uses eleven different risk tables 114:

1. Alert Type
2. Bill Type
3. Call Type
4. Dial Type
5. Originating Trunk Group
6. Property Name
7. Source Name
8. Source Type Name
9. TACS Qualifier
10. Velocity Screening Number Type
11. Case Alert Rate The first ten risk tables track the rates of occurrence and the time of last update for the four dispositions (fraud, non-fraud, unconfirmed fraud, unworked) for each of the unique categorical values of the alert field in question. One embodiment of an unpopulated alert type risk table is illustrated below in Table 2:

TABLE 2

Alert Type Risk Table

| Alert Code | Alert Type Description | Time of last Update date | Fraud | Non-fraud | Unconfirmed Fraud | Unworked |
|---|---|---|---|---|---|---|
| c | Low level collision | | | | | |
| C | High level collision | | | | | |
| g | Low level geo velocity | | | | | |
| G | High level geo velocity | | | | | |
| b | Low level volumetric | | | | | |

TABLE 2-continued

Alert Type Risk Table

| Alert Code | Alert Type Description | Time of last Update | Fraud | Non-fraud | Unconfirmed Fraud | Un-worked |
|---|---|---|---|---|---|---|
| B | High level volumetric | | | | | |
| S | Single call duration | | | | | |
| d | Low level aggregate duration | | | | | |
| D | High level aggregate duration | | | | | |
| H | Hot number | | | | | |
| R | Exclusion rule | | | | | |

The case-alert rate risk table, Table 3, is slightly different in that the key is a rate that is a numerical value, rather than a categorical value. The key that is used is the actual case-alert rate as found in the account profile (Short Term Rate of All Alerts). Thus, this risk table tracks the rates of occurrence and the time of last update for the four dispositions for ranges of the case alert rate. Thus, if a case had an alert rate of 3, the values in the second row of Table 3 below would be used to calculate the alert rate risk, since $2 \leq 3 < 5$.

TABLE 3

Case Alert Risk Table

| Case Alert Rate [Min, Max) | Time of last Update | Fraud | Non-fraud | Unconfirmed Fraud | Un-worked |
|---|---|---|---|---|---|
| [0, 2) | | | | | |
| [2, 5) | | | | | |
| [5, 10) | | | | | |
| [10, 20) | | | | | |
| [20, 50) | | | | | |
| [50, 100) | | | | | |
| [100, 200) | | | | | |
| [200, 500) | | | | | |
| [500, 1000) | | | | | |
| [1000, Inf) | | | | | |

Once the correct row is selected for a given value of an alert field or case alert rate, the risk associated with that value is calculated as the ratio of the rates of risky alerts to the rates of all worked alerts:

$$\text{Risk} = \frac{(\text{fraud rate} + \text{unconfirmed rate})}{(\text{fraud rate} + \text{unconfirmed rate} + \text{nonfraud rate})}$$

Note that if the denominator is zero, risk is defined to be zero.

Predictive Model

The predictive model 112 receives input from the customer alert profile database 110, the case engine 118, and risk tables 114. The case engine also has access to certain CDR information about the CDRs that generated the alerts. In a preferred embodiment, values preserved from the CDRs include the following:

| Field Name | Field Description |
|---|---|
| SWPropertyName | switch that the call was received from |
| LogicalQIDNAME | the alert type |
| VCScrnNumber | Number the alert was generated on (billing number, originating number, terminating number) |
| VCScrnNumTypeName | Full text Number type the alert was generated on ("Billing", "originating terminating") |
| BillingNumber | the billing number of the call |
| ReceivedTimeSecs | time the system received the CDR |
| FirstElemSecs | time the call began |
| PostTimeSecs | time the rules engine processed the call |
| EndTimeSecs | time the call was completed |
| BillType | the bill type of the call |
| CallType | the type of call made |
| BillNumberPin | pin number used, if made with calling card |
| DialType | dial type |
| CDR_ID | the unique id of the CDR that generated the alert |
| CardTypeName | card type, if calling card is used |
| OrigTrunkGroup | originating trunk group |
| CIC | carrier identification code |
| CustomerCode | the account number for the customer |

Fields that are generated in a preferred embodiment by the rule engine 104 from the CDRs that created the alert are:

| Field Name | Field Description |
|---|---|
| AlertID | a unique number to identify the alert |
| GVCRate | the rate used in calculating geo-velocity collisions |
| ThreshValExceed | the threshold value exceeded |
| VCQuantity | the actual value that exceeded the threshold |
| PeriodName | name of period, if used (i.e. name associated with holidays or multipliers) |
| PropertyName | property in the hierarchy used to define threshold for alert |
| SourceName | the name of the property or class that generated the alert |
| SourceTypeName | source of threshold (property or class) |

Fields that are added to the alert by the case engine in a preferred embodiment are:

| Field Name | Field Description |
|---|---|
| AlertScore | score of the alert |
| Disposition | analyst given disposition of the alert |

The predictive model 112 in a preferred embodiment is a neural-network-based statistical tool that learns how various inputs can be correlated to predict a certain target variable, and that can be incrementally trained by example, as new alerts are decisioned by an analyst. This means that historical alert and disposition information can be used to pre-train the predictive model 112 and risk tables 114 before the model is put online, so that the system 100 can have a running start at install time. In a preferred embodiment, the predictive model is an Extended Kalman filter. Each time a case is closed, the tagged alerts are sent to the Kalman filter and the model weights are updated. In this way, the predictive model 112 builds and updates a knowledge base to help the analyst manage workflow by predicting the relative degree of risk in each case.

The output of the predictive model 112, determined in a manner described below, is a fraud score indicative of the likelihood that the call that generated the alert was fraudulent. The score is attached to the case and returned by the predictive model 112 to the case engine 118. The score is preferably on a scale from 1–999, though other scales may be used. An alert with a score of 800 would therefore be much riskier than an alert with a score of 200, and should be worked first.

In a preferred embodiment of the predictive model, the Extended Kalman filter output is a number on the unit interval (0,1). The Extended Kalman filter output attempts to predict the Boolean risky alert tag:

$$\text{risk tag} = \begin{cases} 0.9, \text{ for fraud or unconfirmed fraud} \\ 0.1, \text{ for nonfraud} \end{cases}$$

While the values 0.9 and 0.1 used as target values can be adjusted to change the score distribution in some embodiments, in a preferred embodiment the target values are fixed. Because unworked alerts are excluded from training the network, their scores are similar to the most common disposition, which is non-fraud. Thus, fraudulent and unconfirmed fraud alerts will tend to give raw scores closer to 0.9, while non-fraudulent and unworked alerts will tend to score closer to 0.1.

The raw score is mapped onto a score range of [1, 999] by using a linear function:

scaled score=floor(999*raw score)+1 where raw score is the output of the Extended Kalman filter.

Once a scaled score has been computed for an alert, the summary case scores are updated. These summary scores are designed so they can be used to prioritize cases. In a preferred embodiment, the scores are as follows:

Creation score is the score of the profile as soon as the first alert was processed.

Current score is the score of the profile at the time the most recent alert was processed.

High score is the maximum score of any alert in the case.

Queuing

The predictive model 112 sends cases containing scored alerts back to the case engine 118 along with the score. The case engine 118 then sends the case to the queuing engine 120 for assignment to one of the queues 116 according to a priority. Analysts use analyst workstations 122 to examine cases from the queues 116, preferably in order of highest-to-lowest priorities. To facilitate the prioritization of cases, in a preferred embodiment, each case is assigned a case score. While they may be related, a case score is distinct from an alert score. Score types that a case may be assigned in a preferred embodiment include creation score, current score, and high score, as detailed above.

In alternative embodiments, fields that are used to determine priority also include the current number of alerts in the case; the last time the case was updated; and the time that the case was created.

In addition, cases may be queued for disposition for reasons other than risk. For example, it may be more efficient to have newly trained analysts receive cases that are fairly simple, while more experienced analysts study the more difficult cases. Thus, in a preferred embodiment, cases additionally include the following fields that may be used by the queuing engine to determine queuing priority:

case number—a unique incrementing number, where the higher the number, the more recently the case was created.

case worked status—whether the case is unworked, pending, open, or closed.

case disposition—whether the case has been marked as fraud, nonfraud, unconfirmed.

cic (carrier information code)—used for segmenting customer traffic.

callback—whether another analyst has deemed this case is worth looking into again.

Analysts

Analysts are assigned to one or more queues 116. To maximize efficiency, and minimize the risk of loss resulting from fraudulent activity, analysts first work those cases that have higher fraud scores. As they analysts examine alerts within a case, they assign disposition values to the alerts. In a preferred embodiment, there are four possible values:

Fraud: When an analyst confirms with a customer that an alert is fraud-related.

Non-fraud: When an analyst confirms with a customer that an alert is not fraud-related.

Unconfirmed fraud: When an analyst is confident that an alert is fraud-related without confirmation from the customer (i.e. when the analyst is willing to take action against the account).

Unworked: When an analyst is unsure whether the alert is fraud or not, or when the alert has not been examined by the analyst.

Cases as a whole may also be assigned values, as follows:

Fraud: A case is considered fraudulent if it contains at least one fraudulent alert.

Unconfirmed fraud: A case is considered unconfirmed fraud if it contains at least one unconfirmed fraud alert, and no fraud alerts (i.e. fraud takes precedence over unconfirmed fraud).

Non-fraudulent: A case is considered non-fraudulent if it contains at least one non-fraudulent alert and no fraud or unconfirmed fraud alerts.

Unworked: A case is considered unworked if it contains only unworked alerts.

It should be noted that typically, service providers organize billing information based upon a tiered structure, though the specifics of that tiered structure may vary from carrier to carrier. Individual phone lines (ANI's) lie at the lowest tier. Higher tiers may group ANI's or services by Billing Telephone Numbers (BTN's), by building, location, or department, and ultimately by the customer.

As an example of a billing system, consider a fictional telephone company TelCo Inc. TelCo Inc. has a three-tiered billing system that handles primarily business customers. At the bottom level of the billing system is the ANI. At the next level up is a billing account number (BAN) that is location or department specific. Above that is a customer code that aggregates all billing account numbers for a given customer. For instance, TelCo Inc. may have 10 buildings, each with 2000 phone lines. Therefore, they would have 20,000 phone lines (or ANI's). Each of those 10 buildings might have a unique billing account number, in order to distinguish them for billing purposes. In addition, there would be one customer code to distinguish the company from an account of another company.

Thus, telephone companies using system 100 may choose to perform case management at the billing account number level (the middle tier in TelCo Inc's hierarchy). This prevents the analyst from becoming swamped with 20,000 different cases from the same large company, one for each ANI, and yet it does not clump all buildings or departments together. Typically, different buildings or departments in a company may use their telephone services quite differently. Consider the usage patterns of corporate offices, marketing, sales, customer support, or engineering; each would be quite different. Modeling at the middle tier in the billing hierarchy captures those differences. It will be noted, however, that modeling could take place at any of the other levels in a similar manner. In each instance, CDRs will still be evaluated against Telco defined rules, and when one or more rules are matched, an alert will be generated.

Updating

When an analyst works a case and all alerts are assigned a disposition, the decisioned case is sent by the queuing engine 120 back to the case engine 118. Data is also sent to the risk tables 114. Using this data, the risk tables 114 update their variable weights to improve fraud detection performance, as described below. When the case engine 118 receives the decisioned case back from the queuing engine, it sends the decision to the predictive model 112. The predictive model uses this decision information to learn, as described below, thus improving its fraud predicting abilities. The case engine 118 then marks the case as closed, and sends it to the case database 108 for storage.

In practice, cases are not dispositioned immediately because of the delay between alert generation and analyst availability. While a case is accumulating alerts, the profile for that customer may be updated as other alerts are generated and scored. When the case is finally dispositioned, the profile may differ from the profile as it existed during scoring of the alert, due to intervening alerts and updated risk tables. Similarly, when the predictive model is updated, there is a time lag between scoring and model update, during which the customer profile may be affected. Therefore, the customer profile used in conjunction with the fraud tag (disposition) may be out of phase by the time it is received by the predictive model.

The model creates the input vector once again from the customer profile. The risk tag is then created from the fraud tag:

$$\text{risk tag} = \begin{cases} 1, \text{ for fraud or unconfirmed fraud} \\ 0, \text{ for nonfraud} \end{cases}$$

This input vector is then presented to the Kalman filter along with the risk tag, and the Extended Kalman filter weights and intermediate matrices are updated.

Next, the risk tables 114 are updated. The Extended Kalman filter weights are updated using the profile as it then appears. (Note that, as described above, the profile as it existed at the time of scoring is irretrievably lost in a preferred environment.) Each of the 11 risk tables is then updated. The updates are done in this order so that the predictive model can learn to better predict using the state of the profile prior to receiving the disposition information. For each risk table, only the row matching the case alert rate or alert field in question is updated. For instance, for a low-level call collision alert, only the row corresponding to low level call collisions would be updated. For that row, the column matching the alert disposition is decayed and then incremented by 1. The other three disposition columns are simply decayed. For instance, if the alert was unconfirmed fraud, then the unconfirmed fraud would be decayed and then incremented by 1, while the other three rates (fraud, non-fraud, and unworked) are decayed without being incremented. The time difference by which the rates are decayed are:

$$\Delta t_i = \begin{cases} t_i - t_{i-1}, \text{ if } t_i < t_{i-1} \\ 0, \text{ otherwise.} \end{cases}$$

where $t_i$=ENDTIME of current alert and $t_{i-1}$=ENDTIME of last disposition. The decay constant is the same as the short-term decay constant of the profile variables, or 1.5 days in a preferred embodiment.

The time of last disposition of that row is then ratcheted up, if the time of the current alert is greater than the time of last disposition.

Those variables of the customer profile that are concerned with the rates of the four dispositions and the average risk of the case are updated after the risk tables are updated, using the time of last disposition and time of the current alert to determine the time difference for decay purposes. Just as was done for the risk tables, the four disposition rates are either decayed and incremented by one or simply decayed, according to the alert disposition. The short-term average case risk is decayed and then incremented by the case risk, as per the four short-term case disposition rates.

The time of last disposition for the profile is then ratcheted up, only if the time of the current alert is greater than the time of last disposition.

Architecture and Flow

Figure 3:
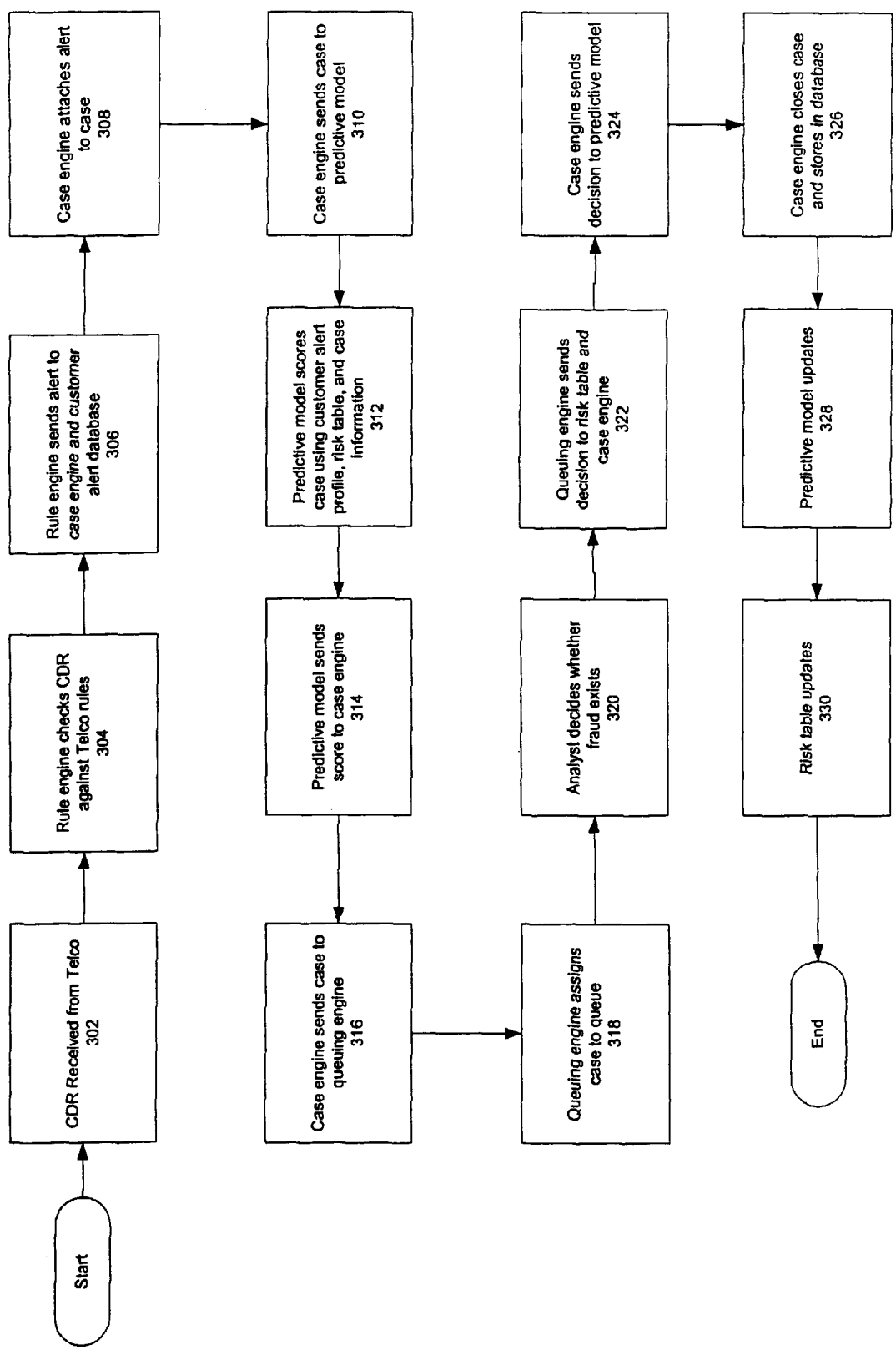
FIG. 3 is a flow chart of steps taken in an embodiment of the present invention.

The steps taken in a preferred embodiment include the following, with reference being had to FIG. 3. A CDR 102 is received 302 from the Telco by the communications server 103. The rule engine 104 checks 304 the CDR 102 against the Telco rules stored in the rule database 106. If an alert is generated, the rule engine sends 306 the alert to both the case engine 118 and the customer alert profile database 110. The case engine 118 attaches 308 the alert to a case. The operation of the case engine 118 is further described below with respect to FIG. 4. The case engine sends 310 the case to the predictive model 112, and the predictive model 112 scores 312 the alerts in the case using the risk tables 114, the customer alert profile found in the customer alert profile database 110, and case information. The predictive model sends 314 the score back to the case engine, which then sends 316 the case to the queuing engine 120. The queuing engine assigns 318 the case to a position in the queue 116 based on the fraud score of the alerts in the case. An analyst examining the case in the queue decides 320 whether fraud in fact exists in that case. The queuing engine then sends 322 the decision made by the analyst back to the risk tables 114 and to the case engine 118. The case engine additionally sends 324 the alerts associated with a closed case, and their corresponding dispositions to the predictive model 112. The case engine next closes 326 the case, and stores it in the case database 108. The predictive model learns from the decision made by the analyst and performs 328 an update. Likewise, the risk tables variables are updated 330 based on the analyst's decision.

Figure 4:
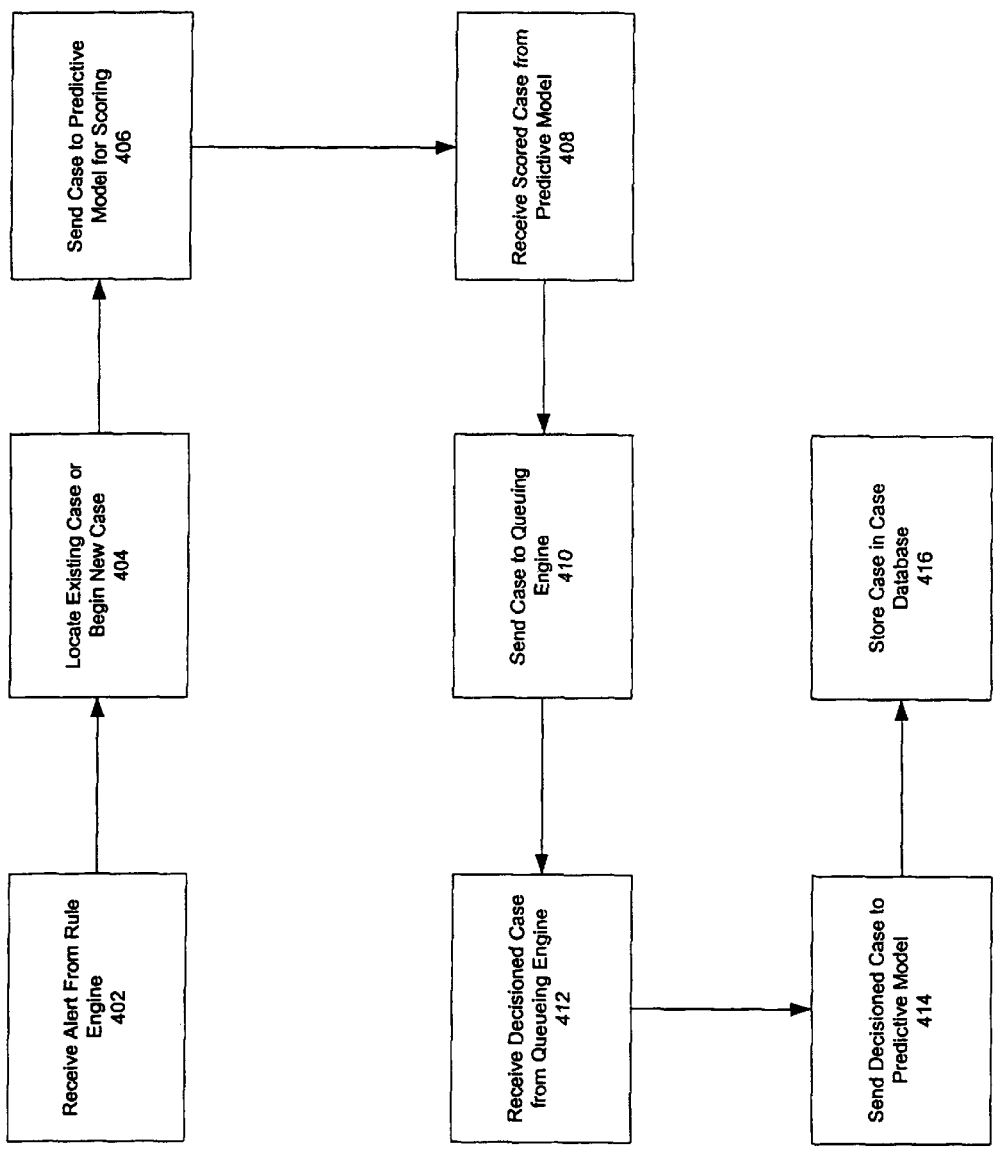
FIG. 4 is a flow chart of steps taken by the case engine in one embodiment of the present invention.

The steps taken by the case engine 118 in a preferred embodiment are as follows, reference being had to FIG. 4: the case engine receives 402 an alert from the rule engine 104. The case manager attempts to locate 404 a case to which the alert can be added by examining cases stored in the case database 108. If a case is located in the database 108, the alert is added to that case. If no case can be located, the case engine then creates a new case, and adds the alert to the new case. Once the alert is attached to the case, the case engine then sends 406 the alert to the predictive model to be scored. The predictive model assigns a score to the alert and sends it back to the case engine. At this point, the case engine compares the score with the previous high score of the case and determines whether the new score should be the high score. The case engine also uses the score to update the "current score" value in the case, and if it is the first alert in the case, it also updates the "creation score" value. Either of these fields is used in preferred embodiments for queuing purposes.

The queuing engine determines whether the case is determined to be fraudulent, and the case engine receives 412 the decisioned case from the queuing engine 120. The case engine sends 414 the alerts associated with the case, and their corresponding dispositions to the predictive model 112 for training, and then stores 416 the case in the case database 108.

The present invention may be implemented in a plurality of embodiments. In one embodiment, the system 100 is located at the same location as the Telco, and is connected to the Telco CDR generating system via a local area network (LAN) or other network-type system. In another embodiment, the system 100 may exist in a location remote from the Telco's own billing system. The Telco may connect to the system 100 via a network such as the Internet, using a protocol such as FTP, telnet, HTTP, etc.

Also, in some embodiments, the analysts who determine whether or not scored cases are fraudulent are located at the same location as the system 100. In other embodiments, the analysts may be located at the Telco, and scored cases may be downloaded from the system 100. In one embodiment, for example, analysts may be at the Telco site and use a World Wide Web connection to the system 100 to view cases and make fraud/no-fraud decisions.

Bandwidth Leasing

In one embodiment, one Telco may be leasing bandwidth to another Telco. This often occurs because telephone call volume changes rapidly, and one Telco may find its bandwidth suddenly underutilized, while another Telco finds it has no bandwidth to spare. In order for the Telco providing the bandwidth (the lessor) to do successful fraud detection, it should have access to the complete CDRs for all calls it carries, including those carried over leased-out bandwidth. For the Telco buying the bandwidth (the lessee), however, providing complete CDR information, including identifying information for the originating telephone number, is not desirable, because the lessor may choose to use that information to solicit telephone customers away from the other Telco. The present invention overcomes this stalemate by providing an intermediary. In this embodiment, system 100 is outside of the control of either Telco, and is managed by a third (trusted) party. The CDR 102 containing complete information is sent to the system 100, and the case is scored by the predictive model 112. The stripped CDR is sent from the lessee Telco to the lessor Telco. A score indicative of the likelihood of fraud is then sent to the Telco providing the bandwidth. That lessor Telco has an analyst to evaluate the scored cases and make fraud determinations. In this way, both the confidentiality of CDR records is maintained, and more accurate fraud/no-fraud determinations can be made.

Figure 5:
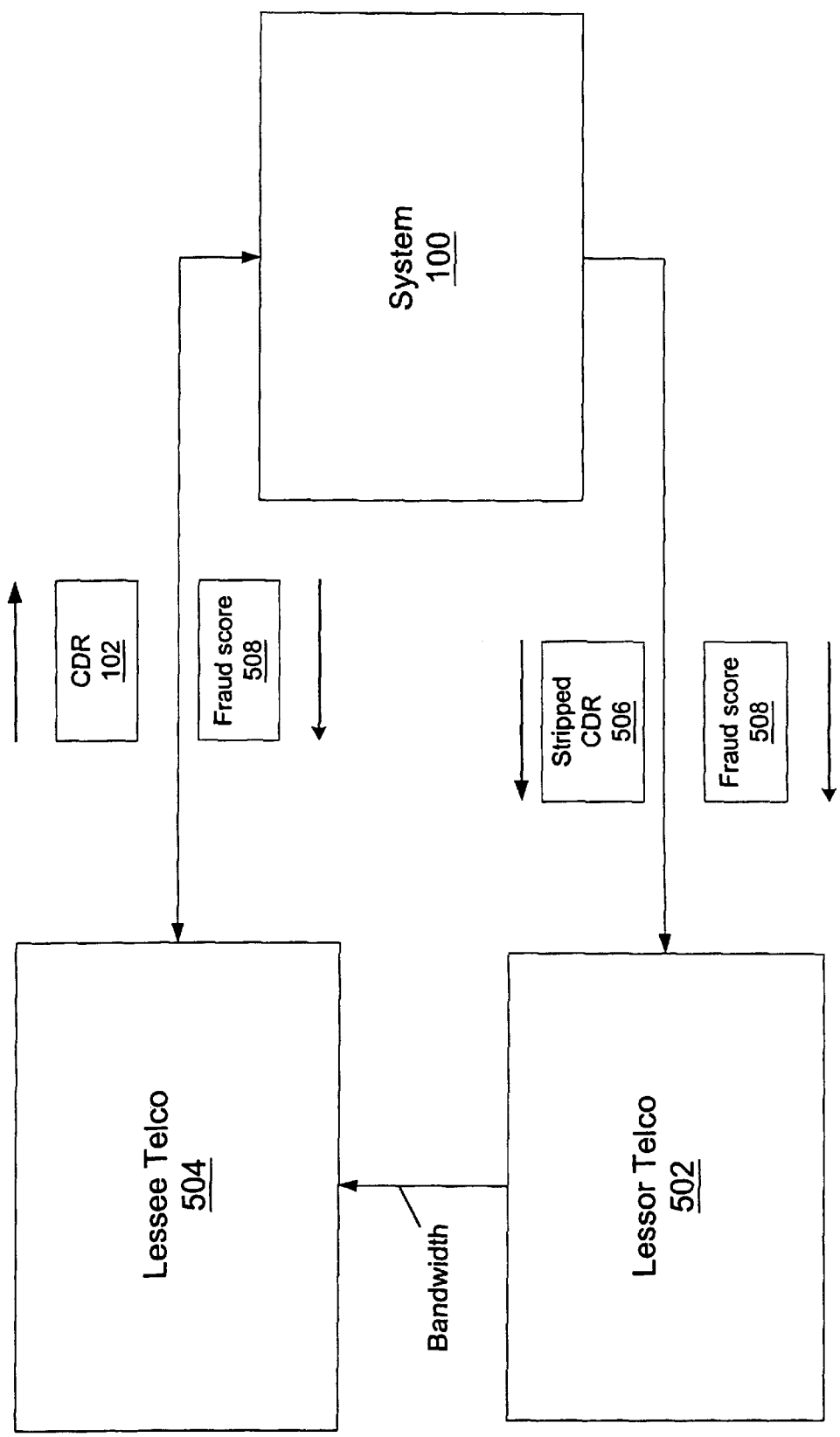
FIG. 5 is a diagram illustrating the determination of fraud scores when bandwidth is leased between telephone companies, in accordance with an embodiment of the present invention.

Referring now to FIG. 5, there is shown a diagram illustrating how Telcos leasing bandwidth can still receive fraud scores. The lessor Telco 502 provides bandwidth to the lessee Telco 504. A call is made by a customer of the lessee Telco, which is carried over the lessor's lines. The full CDR 102 containing sensitive information is sent to system 100 for scoring. System 100 determines the fraud score 508, and sends the score 508 to both the lessor 502 and the lessee 504 Telcos, though in other embodiments, the score may be sent only to the lessor Telco 502. The system 100 also provides the lessor Telco 502 with a stripped CDR 506, which does not contain sensitive information such as the billing number.

Note once again that analysts and queues may be at the system 100, or may be at the Telco site. For example, in the case of Telcos that share bandwidth, the lessor Telco 502 may have analysts at analyst workstations 122 at the Telco 502 site. The queues 116 may be at the system 100 location and accessed, e.g., via HTTP, or they may be at the Telco 502 site. In some embodiments, there is a system 100 provided for each Telco.

In one embodiment, system 100 also maintains system report tables. The system report tables keep track of system and analyst performance. A fraud manager can generate daily, weekly, monthly, or yearly reports of alerts assigned to each of the four disposition types. Similar reports can be generated for alert type or the average time taken for analysts to open or close cases. Another report shows the histogram of various dispositions for different score ranges. This report is a good measure of how well the model is doing at prioritizing cases; higher score ranges on average will contain a higher percentage of fraudulent cases. Reports also exist for showing queues, the cases assigned to those queues, the analysts working the cases, and the status of each case. Another report monitors the evolution of the fraction of fraudulent alerts processed. This report is useful for understanding how fraud trends are changing, as well as how effective the threshold may be at capturing fraud.

By using the present invention, fraud managers and analysts will have effective tools to make them more efficient in working cases. The system 100 helps analysts work cases by billing accounts, rather than at the ANI level. The system 100 provides a valuable interface to provide frequently necessary billing information at one keystroke. The predictive model helps adaptively prioritize those cases based upon learned risk, rather than heuristics. System reporting helps fraud managers better understand both the fraud and case trends, as well as the workload and efficiency of their analysts. All of these tools provide fraud managers and analysts with a competitive advantage in fighting fraud.

As will be understood by those familiar with the art, the invention may be embodied in other specific forms without departing from the spirit or essential characteristics thereof, and the mechanisms that implement the invention or its features may have different names or formats. Accordingly, the disclosure of the present invention is intended to be illustrative, but not limiting, of the scope of the invention.

Appendix 1: Customer Profiles

The following table lists profile fields of the customer profiles, and indicates which fields are used as inputs to the model.

| Profile Field | Model Input |
| --- | --- |
| Time of Last Alert | No |
| Time of Last Disposition | No |
| Short Term Rate of All Alerts | Yes |
| Short Term Rate of Low Level Call Collision Alerts | Yes |
| Short Term Rate of High Level Call Collision Alerts | Yes |
| Short Term Rate of Low Level Geographic Velocity Alerts | Yes |
| Short Term Rate of High Level Geographic Velocity Alerts | Yes |
| Short Term Rate of Low Level Volumetric Alerts | Yes |
| Short Term Rate of High Level Volumetric Alerts | Yes |

| Profile Field | Model Input |
| --- | --- |
| Short Term Rate of Low Level Aggregate Duration Alerts | Yes |
| Short Term Rate of High Level Aggregate Duration Alerts | Yes |
| Short Term Rate of Single Call Duration Alerts | Yes |
| Short Term Rate of Hot Number Alerts | Yes |
| Short Term Rate of Exclusion Rule Alerts | Yes |
| Average Risk Alert rate * Average risk originating Trunk Group | Yes |
| Unknown Count * Unknown Count | Yes |
| Average risk TACSqualifier * Average risk TACSqualifier | Yes |
| Average risk Property Name * Rate Hot Number | Yes |
| Rate of Non fraud * Rate Hot Number | Yes |
| Average risk originating trunk group * rate hot number | Yes |
| Fraud count | Yes |
| Nonfraud count | Yes |
| Unknown count | Yes |
| Case alert rate risk | Yes |
| Alert type risk | Yes |
| Short Term Average Risk Weighted Rate of All Alerts | Yes |
| Short Term Average Risk Weighted Rate of Low Level Collision Alerts | Yes |
| Short Term Average Risk Weighted Rate of High Level Collision Alerts | Yes |
| Short Term Average Risk Weighted Rate of Low Level Geographic Velocity Alerts | Yes |
| Short Term Average Risk Weighted Rate of High Level Geographic Velocity Alerts | Yes |
| Short Term Average Risk Weighted Rate of Low Level Volumetric Alerts | Yes |
| Short Term Average Risk Weighted Rate of High Level Volumetric Alerts | Yes |
| Short Term Average Risk Weighted Rate of Low Level Aggregate Duration Alerts | Yes |
| Short Term Average Risk Weighted Rate of High Level Aggregate Duration Alerts | Yes |
| Short Term Average Risk Weighted Rate of Single Call Duration Alerts | Yes |
| Short Term Average Risk Weighted Rate of Hot Number Alerts | Yes |
| Short Term Average Risk Weighted Rate of Exclusion Rule Alerts | Yes |
| Long Term Average Risk of Case Alert Rate | No |
| Long Term Average Risk of Alert Type | No |
| Long Term Average Risk of Bill Type | No |
| Long Term Average Risk of Call Type | No |
| Long Term Average Risk of Dial Type | No |
| Long Term Average Risk of Originating Trunk Group | No |
| Long Term Average Risk of Property Name | No |
| Long Term Average Risk of Source Name | No |
| Long Term Average Risk of Source Type Name | No |
| Long Term Average Risk of Qualifier | No |
| Long Term Average Risk of Velocity Screening Number Type | No |
| Ratio of Short Term to Long Term Average Risk of Case Alert Rate | Yes |
| Ratio of Short Term to Long Term Average Risk of Alert Type | Yes |
| Ratio of Short Term to Long Term Average Risk of Bill Type | Yes |
| Ratio of Short Term to Long Term Average Risk of Call Type | Yes |
| io of Short Term to Long Term Average Risk of Dial Type | Yes |
| Ratio of Short Term to Long Term Average Risk of Originating Trunk Group | Yes |
| Ratio of Short Term to Long Term Average Risk of Property Name | Yes |
| Ratio of Short Term to Long Term Average Risk of Source Name | Yes |
| Ratio of Short Term to Long Term Average Risk of Source Type Name | Yes |
| Ratio of Short Term to Long Term Average Risk of Qualifier | Yes |
| Ratio of Short Term to Long Term Average Risk of Velocity Screening Number Type | Yes |
| Short Term Rate of Fraud Alerts | Yes |
| Short Term Rate of Non-fraud Alerts | Yes |
| Short Term Rate of Unconfirmed Fraud Alerts | Yes |
| Short Term Rate of Unworked Alerts | Yes |
| Short Term Average Case Risk | Yes |
| Bill Type risk | Yes |
| Call Type risk | Yes |
| Dial Type risk | Yes |
| Originating Trunk Group risk | Yes |
| Property name risk | Yes |
| Source name risk | Yes |
| Source type risk | Yes |
| TacsQualifier risk | Yes |

What is claimed is:

1. A method for detecting telecommunications fraud comprising:

transmitting a full call data record (CDR) from a first telecommunications provider to a fraud detection system;

determining, by the fraud detection system, a likelihood that the full CDR is associated with fraudulent activity; and transmitting a modified CDR and a fraud score from the fraud detection system to a second telecommunications provider, the modified CDR associated with the full CDR and the fraud score indicating the likelihood that the full CDR is associated with fraudulent activity.

2. The method of claim 1, further comprising transmitting the fraud score to the first telecommunications provider.

3. The method of claim 1, wherein the first telecommunications provider is a lessee of bandwidth from the second telecommunications provider.

* * * * *

UNITED STATES PATENT AND TRADEMARK OFFICE
CERTIFICATE OF CORRECTION

PATENT NO. : 6,597,775 B2
DATED : July 22, 2003
INVENTOR(S) : Lawyer et al.

It is certified that error appears in the above-identified patent and that said Letters Patent is hereby corrected as shown below:

Title page,
Item [75], Inventors, replace
"Justin Lawyer, San Diego, CA (US);
Alex Barclay, San Diego, CA (US);
Dirk Englund, San Diego, CA (US);
Robert Holmes, San Diego, CA (US);
Dimpy Pathria, Burr Ridge, IL (US);
Tim Roach, San Diego, CA (US); Scott Zoldi, San Diego, CA (US);"
with
-- Justin Lawyer, San Diego, CA (US);
Alex Barclay, San Diego, CA (US);
Dirk Englund, San Diego, CA (US);
Robert Holmes, San Diego, CA (US);
Dimpy Pathria, Burr Ridge, IL (US);
Tim Roach, San Diego, CA (US);
Scott Zoldi, San Diego, CA (US); --

Column 10,
Line 6, replace "LogicalQIDNAME" with -- LogicalQIDName --

Signed and Sealed this

Twenty-second Day of February, 2005

JON W. DUDAS
*Director of the United States Patent and Trademark Office*